United States Patent
Pustelnik et al.

(10) Patent No.: US 7,997,330 B2
(45) Date of Patent: Aug. 16, 2011

(54) OIL COOLER

(76) Inventors: Philipp Pustelnik, Vienna (AT);
Thomas Euler-Rolle, Vienna (AT)

( * ) Notice: Subject to any disclaimer, the term of this patent is extended or adjusted under 35 U.S.C. 154(b) by 396 days.

(21) Appl. No.: 11/988,981

(22) PCT Filed: Jul. 13, 2006

(86) PCT No.: PCT/AT2006/000298
§ 371 (c)(1),
(2), (4) Date: Mar. 23, 2009

(87) PCT Pub. No.: WO2007/009141
PCT Pub. Date: Jan. 25, 2007

(65) Prior Publication Data
US 2009/0211741 A1    Aug. 27, 2009

(30) Foreign Application Priority Data
Jul. 15, 2005  (AT) ................. GM485/2005

(51) Int. Cl.
*F28F 3/08*     (2006.01)
*F28F 13/12*    (2006.01)

(52) U.S. Cl. .................. 165/167; 165/916

(58) Field of Classification Search ........... 165/166, 165/167, 170, 916, 119; 123/196 A, 196 AB; 210/175, 184
See application file for complete search history.

(56) References Cited

U.S. PATENT DOCUMENTS

| | | | | |
|---|---|---|---|---|
| 2,063,742 A * | 12/1936 | Holmes | ......................... | 210/186 |
| 2,360,123 A * | 10/1944 | Gerstung et al. | ............ | 165/298 |
| 3,444,926 A * | 5/1969 | Stalberg | ....................... | 165/166 |
| 4,327,802 A * | 5/1982 | Beldam | ......................... | 165/153 |
| 5,307,870 A * | 5/1994 | Kamiya et al. | ................ | 165/173 |
| 5,472,045 A * | 12/1995 | Poehlman | ..................... | 165/119 |
| 5,588,485 A * | 12/1996 | Gire | .............................. | 165/157 |
| 5,810,071 A | 9/1998 | Pavlin | | |
| 6,446,712 B1 * | 9/2002 | Wu et al. | ....................... | 165/167 |
| 6,978,793 B1 * | 12/2005 | Krueger | .................... | 134/169 R |
| 7,287,575 B2 * | 10/2007 | Andersson et al. | ............ | 165/72 |
| 2002/0066552 A1 * | 6/2002 | Komoda | ....................... | 165/170 |
| 2004/0188075 A1 | 9/2004 | Pustelnik et al. | | |

FOREIGN PATENT DOCUMENTS

| | | |
|---|---|---|
| AT | 007 133 U1 | 10/2004 |
| DE | 196 24 358 | 1/1998 |
| DE | 199 39 264 | 2/2001 |
| EP | 0 874 140 | 10/1998 |
| FR | 2 584 806 | 1/1987 |

* cited by examiner

*Primary Examiner* — Tho V Duong
(74) *Attorney, Agent, or Firm* — Cozen O'Connor

(57) ABSTRACT

An oil cooler, in particular for hydraulic oil, which is composed of spaced-apart cooling plates which are in the form of a parallelepiped-shaped package (1), said plates separating coolant channels and oil channels from each other. Connections (3, 4) for supplying and removing the oil and the coolant are provided on the front side (2) of the plate package, and filter plates (4) are arranged upstream from the plate package on the other side (5) of the plate package. The measurements of the filter plates essentially correspond to the measurements of the cooling plates. The filter plates are detachably connected to the plate package via a closing face plate (1'). The filter plates are transversed by oil openings, which are connected to the oil inlet opening (2') in the closing face plate and to an oil inlet opening (2") in the plate package.

7 Claims, 3 Drawing Sheets

OIL COOLER

RELATED APPLICATION

This is a U.S. national stage of application No. PCT/AT2006/000298, filed on Jul. 13, 2006.

This application claims the priority of Austrian Patent application no. GM 485/2005, filed Jul. 15, 2005, the entire subject matter of which is hereby incorporated by reference.

FIELD OF THE INVENTION

The invention relates to an oil cooler, in particular for hydraulic fluid.

BACKGROUND OF THE INVENTION

Customarily such oil coolers are constructed in the form of a parallelepiped-shaped package of spaced-apart plates, which separate cooling medium channels and fluid channels from each other, wherein connectors for feeding and removing the fluid and the coolant are provided at the face ends of the package. Such an oil cooler design is available from Alfa Laval and is known as a "plate heat exchanger".

SUMMARY OF THE INVENTION

One aim of the invention is to improve such a plate cooler in such a way that it can simultaneously perform a filter function. The oil cooler in accordance with an embodiment of the invention comprises filter plates that are arranged at one face end upstream of the plate package, whose dimensions substantially correspond to the dimensions of the cooler plates and which are releasably connected with the plate package by means of a closing face plate, and through which fluid throughput openings extend, which are in connection with a fluid inlet opening in the plate package front face.

It is possible in this way to perform filtering of the inflowing or outflowing fluid, so that a separate filter arranged upstream or downstream of the plate cooler can be omitted in an advantageous manner.

Support plates made of a wire mesh or the like are preferably arranged between the filter plates.

Threaded bolts which keep the filter package together can be passed through the filter plates and, if desired, through the support plates.

DETAILED DESCRIPTION OF THE DRAWINGS

Figure 1:
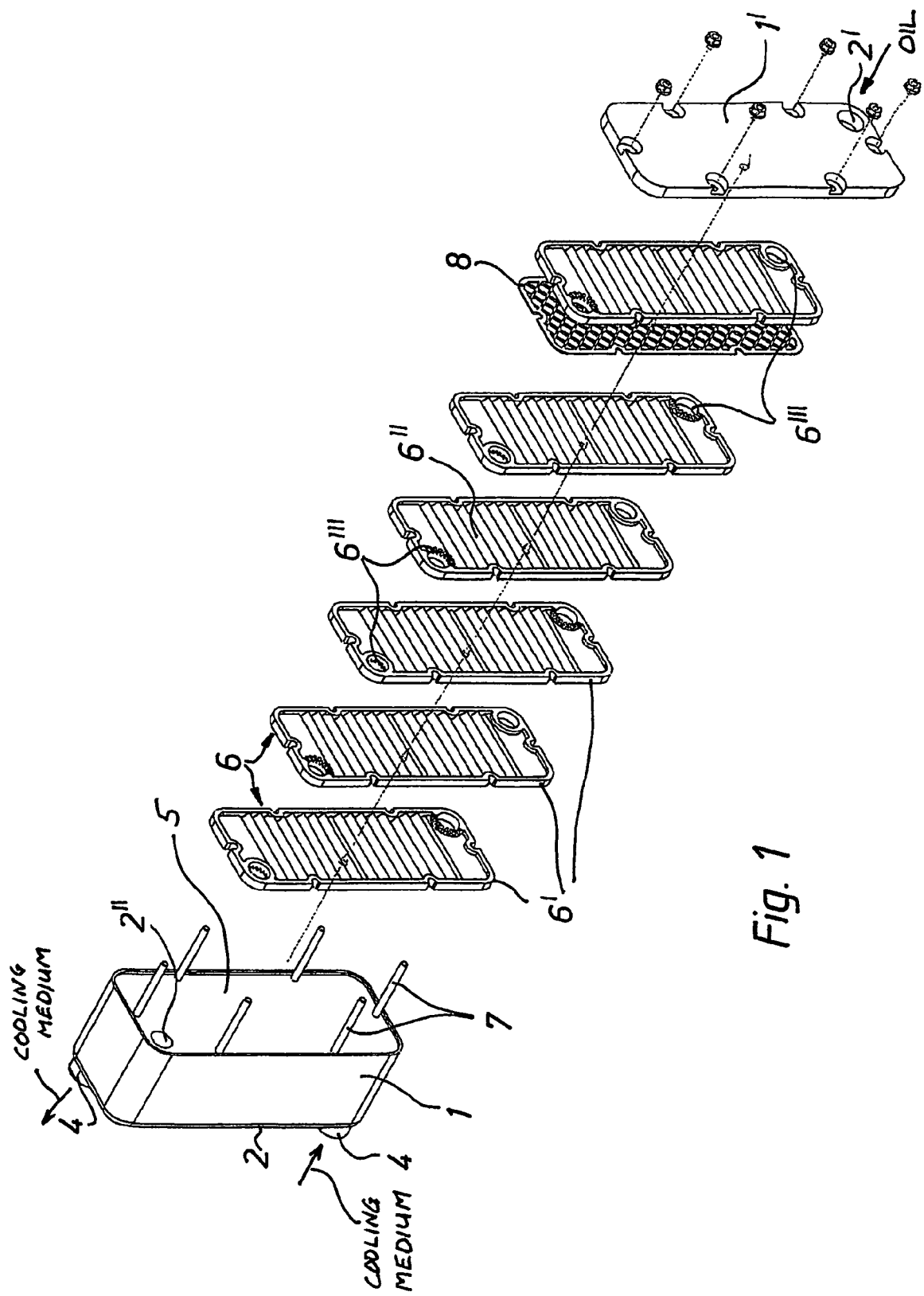
FIG. 1 depicts a plate cooler in accordance with an embodiment of the invention in an exploded view.
Figure 2:
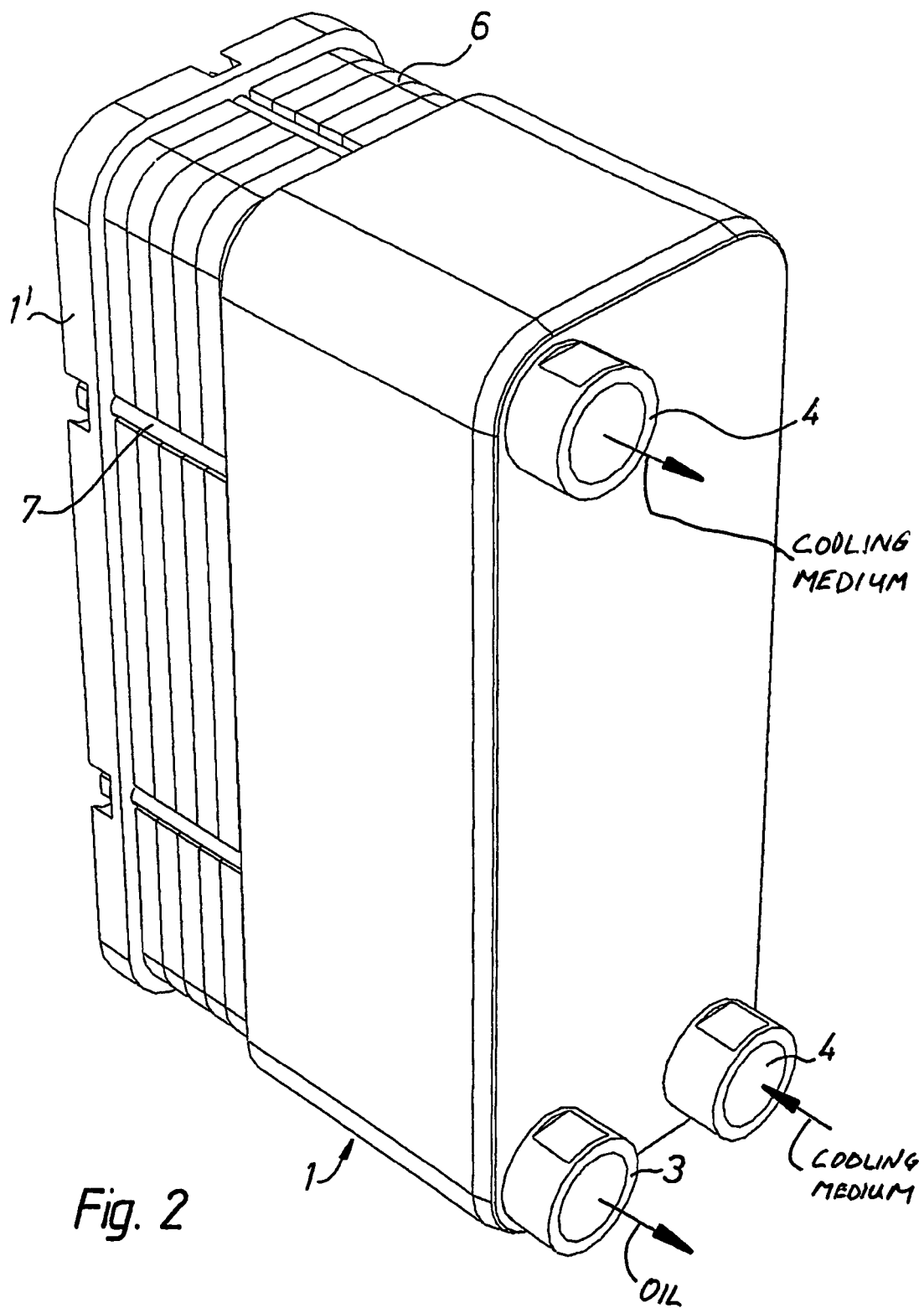
FIGS. 2 and 3 depict perspective views of the oil cooler of FIG. 1 in the assembled state.

As FIG. 1 shows, the hydraulic fluid cooler constructed of parallel plates is composed of a plate package 1, forming fluid channels and cooling medium channels and having a substantially parallelepiped shape. The plates are soldered together at their circumferential edges. Fluid channels and cooling medium channels extend through the package, for which connectors 3 or 4 are provided at a front face 2 of the package. Plate package 1 can be the above-mentioned Alfa Laval plate heat exchanger.

In the represented example, six filter plates 6 have been arranged upstream of a front face 5 of the plate package 1, which are sealingly connected with each other at their circumferential edges 6' and are connected with a closing front plate 1' by means of threaded bolts 7. These filter plates 6 contain diagonally oppositely located through-openings 6''' for the fluid, and are connected with a fluid entry opening 2' in the closing front plate 1' and a fluid inlet opening 2'' in the plate package front face 5. The circumferential edges 6' are made of rubber or plastic and the actual filter medium 6'' of a paper or plastic mat. Additional support plates 8 made of a plastic or steel wire mesh can be arranged between the filter plates 6. Only one of these plates is represented in the example shown. The support plate 8 can also be integrated into the filter plate.

Figure 3:
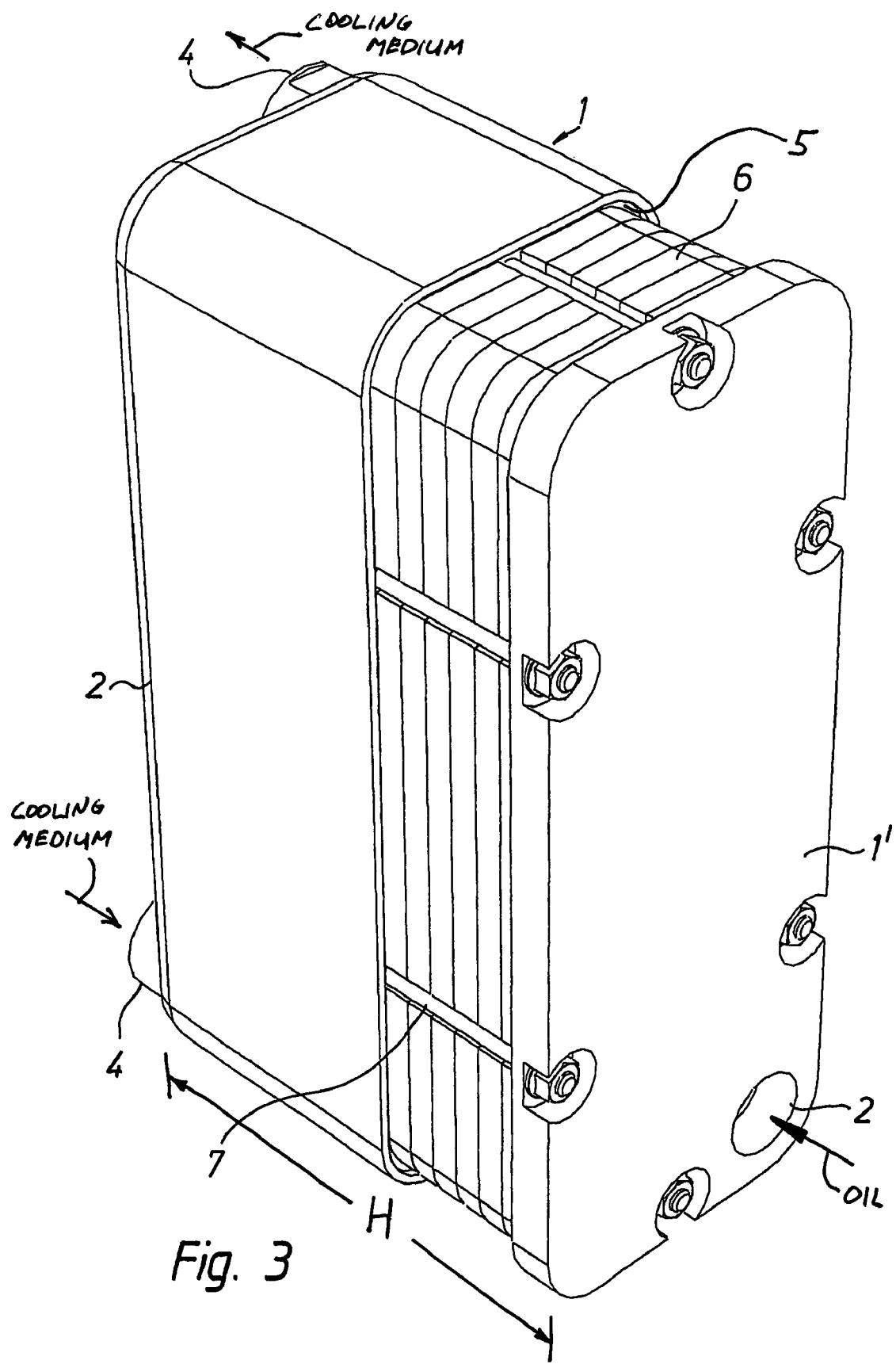

The operating pressure of such a cooler lies between 14 and 20 bar and can amount to up to 30 bar. The appropriate number of filter plates 6 is arranged upstream of the plate package 1 as a function of the filter output and flow-through amount and its installation height (see H in FIG. 3) is varied by means of this.

The invention claimed is:

1. An oil cooler for cooling a hydraulic fluid, and comprising a parallelepiped-shaped package of spaced-apart cooling plates, which separate cooling medium channels and fluid channels from each other,
   wherein connectors for feeding and removing a coolant are provided on a first face of the plate package,
   wherein filter plates are arranged upstream of the plate package in a flow direction of the hydraulic oil and on a second face of the plate package,
   wherein dimensions of the filter plates substantially correspond to dimensions of the cooling plates,
   wherein the filter plates are releasably connected with the plate package by means of a closing face plate, and
   wherein fluid throughput openings extend through the filter plates and connect a fluid inlet opening in the closing face plate with a fluid inlet opening in the plate package.

2. The oil cooler in accordance with claim 1, further comprising support plates made of a wire mesh and arranged between the filter plates.

3. The oil cooler in accordance with claim 1, further comprising threaded bolts for clamping the filter plates together, wherein the threaded bolts pass through the filter plates and are fixed in place on the closing face plate.

4. The oil cooler in accordance with claim 2, further comprising threaded bolts for clamping the filter plates together, wherein the threaded bolts pass through the filter plates and the support plates and are fixed in place on the closing face plate.

5. The oil cooler in accordance with claim 1, wherein each of the filter plates has two of the fluid throughput openings positioned diagonally opposite to each other.

6. The oil cooler in accordance with claim 1, wherein the fluid inlet opening in the closing face plate offsets the fluid inlet opening in the plate package in a flow direction of the hydraulic oil.

7. The oil cooler in accordance with claim 1, further comprising an additional connector for removing the hydraulic oil from the plate package.

\* \* \* \* \*